Figure 1:
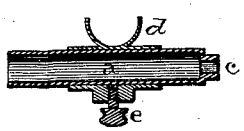
Figure 2:
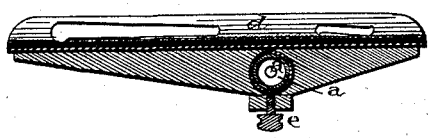
Figure 3:
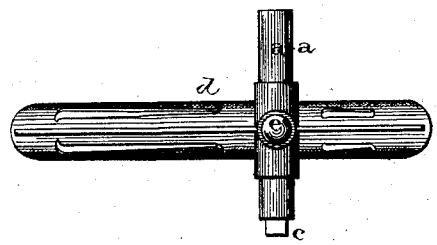

A. S. BOOTH.
Carriage-Top Rests.

No. 156,126.  Patented Oct. 20, 1874.

WITNESSES.  
J. W. Turner  
Frank Clancy

INVENTOR.  
Amasa S. Booth  
per  
F. A. Lehmann, Atty

UNITED STATES PATENT OFFICE.

AMASA S. BOOTH, OF SPRINGFIELD, ASSIGNOR OF THREE-FOURTHS HIS RIGHT TO WILLOUGHBY P. ELAM, OF PETERSBURG, ILLINOIS.

IMPROVEMENT IN CARRIAGE-TOP RESTS.

Specification forming part of Letters Patent No. 156,126, dated October 20, 1874; application filed July 6, 1874.

*To all whom it may concern:*

Be it known that I, AMASA S. BOOTH, of Springfield, in the county of Sangamon and State of Illinois, have invented certain new and useful Improvements in Top-Props for Carriages; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in top-props for carriages, and is intended as an improvement upon the patent granted to W. P. Elam December 30, 1873, No. 145,935.

My invention consists in the arrangement and combination of devices, which will be more fully described hereafter, whereby the rest is made adjustable back and forth upon a round sleeve, which is fitted upon an arm projecting out from the seat-iron, and so that its ends can be raised and lowered in order to adjust the rest more perfectly to the bows.

The accompanying drawings represent my invention.

$a$ represents a round sleeve, which is placed upon an arm which projects out from the railing around the top of the seat, and which sleeve has a square tenon, $c$, formed upon its outer end. This tenon fits in a socket formed in the brace, by which the top is supported in position, and which brace, as the top is raised and lowered, causes the sleeve to turn upon the arm. Slipped over this sleeve, inside of the brace, is the support $d$, which can be adjusted back and forth, and have its ends tilted up and down so as to adjust it most perfectly to the bows which rest upon it, the support being held in any desired position by means of the set-screw $e$.

I am aware that a support made adjustable back and forth upon a square arm is not new, and this I disclaim.

Having thus described my invention, I claim—

In a support for the bows of buggy-tops, the combination of the sleeve $a$, having the square tenon $c$ upon its end, whereby it is turned by the brace, with the support $d$, which can be adjusted back and forth, and tilted up and down, and secured in any desired position on the sleeve by means of the set-screw $e$, substantially as shown and described.

In testimony that I claim the foregoing I have hereunto set my hand this 16th day of June, 1874.

AMASA S. BOOTH.

Witnesses:
SAML. D. SCHOLES,
W. P. ELAM.